US009762296B2

(12) United States Patent
Takei

(10) Patent No.: US 9,762,296 B2
(45) Date of Patent: Sep. 12, 2017

(54) WIRELESS COMMUNICATION SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/964,905

(22) Filed: Dec. 10, 2015

(65) Prior Publication Data
US 2016/0182185 A1    Jun. 23, 2016

(30) Foreign Application Priority Data

Dec. 18, 2014  (JP) ................. 2014-256169

(51) Int. Cl.
*H04B 7/00* (2006.01)
*H04L 27/00* (2006.01)
*H04L 5/04* (2006.01)

(52) U.S. Cl.
CPC ............ *H04B 7/002* (2013.01); *H04L 5/04* (2013.01); *H04L 27/0002* (2013.01)

(58) Field of Classification Search
None
See application file for complete search history.

(56) References Cited

U.S. PATENT DOCUMENTS 3,760,274 A * 9/1973 Vogt .................... H04B 14/008
342/361

5,267,268 A * 11/1993 Kallander ............ H04B 14/008
342/361
2001/0003442 A1    6/2001 Smith
(Continued)

FOREIGN PATENT DOCUMENTS

JP        10-332805 A    12/1998
JP      2002-513537 A     5/2002
(Continued)

*Primary Examiner* — Gennadiy Tsvey
(74) *Attorney, Agent, or Firm* — Crowell & Moring LLP

(57) ABSTRACT

[Object]
A wireless communication system capable of detecting propagation path modification from the outside and compensating for degradation of quality of communication between transmission and reception with respect to the propagation path modification is provided. A wireless communication system includes a transmitter that transmits electromagnetic waves in which a polarization direction rotates according to a signal in which data is loaded on a carrier, and a receiver that receives the electromagnetic waves and demodulates the data, in which the transmitter imparts angle information indicating a polarization direction for transferring the data to the signal, and sets a rotation frequency of the polarization direction to a frequency lower than a frequency of the carrier, and the receiver changes a polarization direction of the received electromagnetic waves, based on the angle information transferred by the electromagnetic waves. The receiver can detect propagation path modification from the outside using the angle information of the polarization direction, and compensate for degradation in quality of communication between transmission and reception by changing the polarization direction of the received electromagnetic waves when the modification is detected.

15 Claims, 11 Drawing Sheets

(56) References Cited

U.S. PATENT DOCUMENTS

| | | | | |
|---|---|---|---|---|
| 2002/0181439 A1* | 12/2002 | Orihashi | ............... | H04J 3/0605 |
| | | | | 370/350 |
| 2003/0162566 A1* | 8/2003 | Shapira | .................. | H01Q 1/246 |
| | | | | 455/561 |
| 2004/0104843 A1* | 6/2004 | Mimura | ............. | G01R 29/0892 |
| | | | | 342/362 |
| 2004/0264592 A1* | 12/2004 | Sibecas | .................. | H01Q 21/24 |
| | | | | 375/267 |
| 2010/0001904 A1* | 1/2010 | Iwamatsu | ............... | H01Q 3/30 |
| | | | | 342/372 |
| 2011/0007758 A1* | 1/2011 | Macrae | .................... | H04B 7/10 |
| | | | | 370/480 |
| 2011/0019630 A1* | 1/2011 | Harris | ...................... | H03D 3/02 |
| | | | | 370/329 |
| 2013/0107991 A1* | 5/2013 | Hinson | .................. | H01Q 19/30 |
| | | | | 375/340 |
| 2013/0336417 A1* | 12/2013 | Takei | ....................... | H04B 7/10 |
| | | | | 375/267 |
| 2015/0381242 A1* | 12/2015 | Takei | ....................... | H04B 7/10 |
| | | | | 375/260 |
| 2016/0255499 A1* | 9/2016 | Takei | ....................... | H04B 7/10 |

FOREIGN PATENT DOCUMENTS

| | | | | |
|---|---|---|---|---|
| JP | 2007-150646 A | 6/2007 | | |
| JP | WO 2014155470 A1 * | 10/2014 | ........... | H04B 7/0682 |
| JP | WO 2016075785 A1 * | 5/2016 | ............... | H04B 7/10 |
| WO | WO 2013/140457 A1 | 9/2013 | | |

* cited by examiner

[Fig. 1]
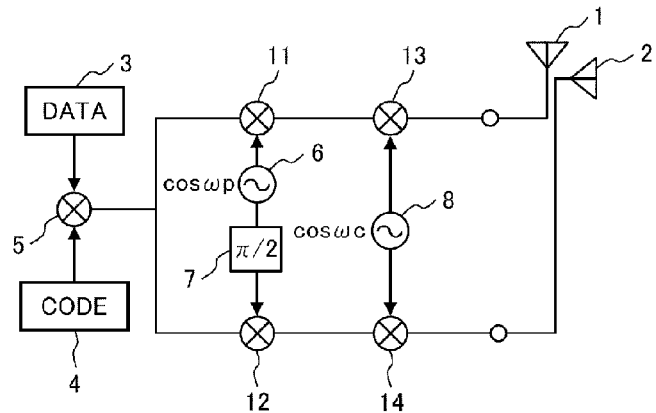
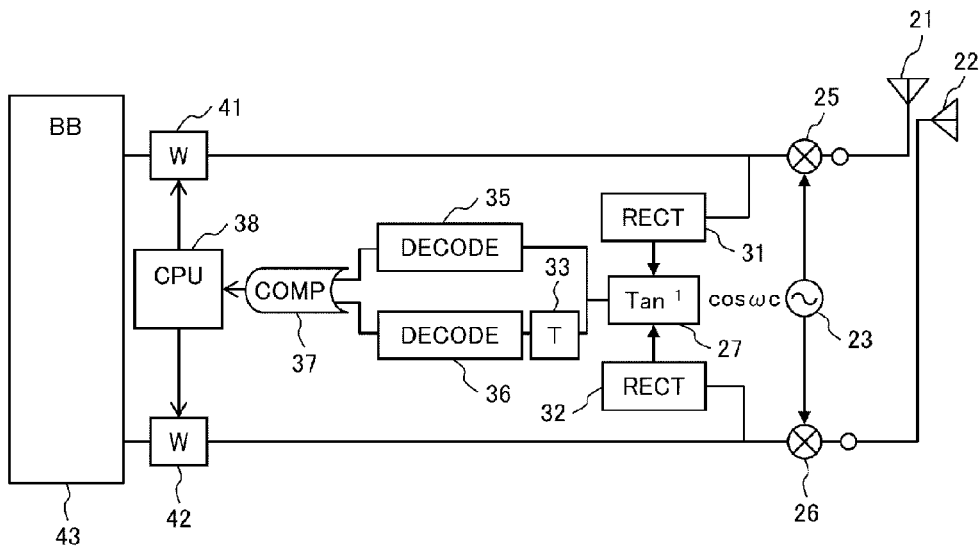

[Fig. 2]
TRANSMITTER
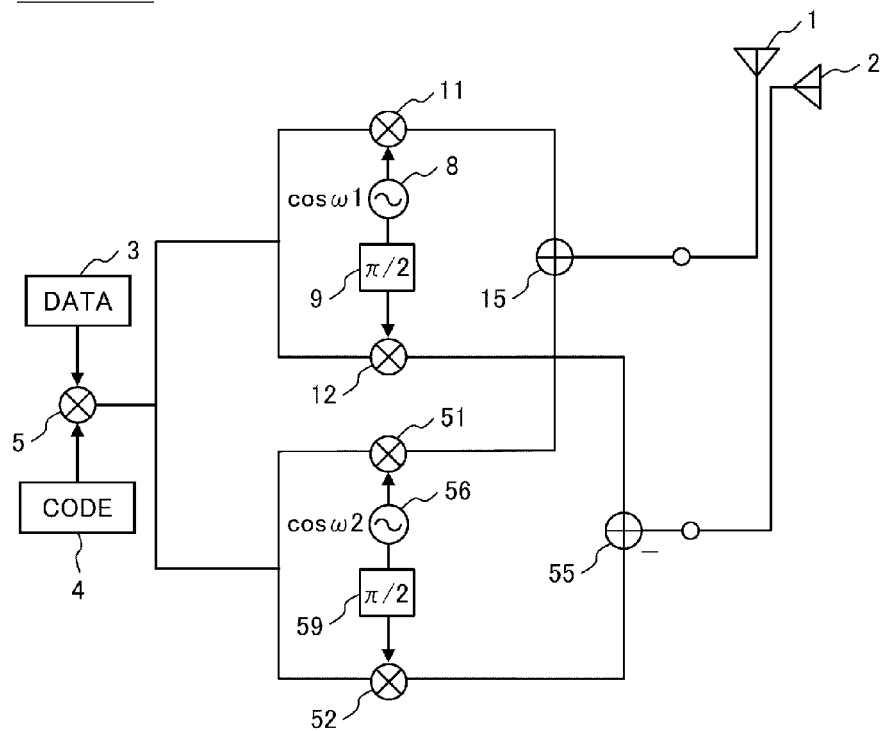
[Fig. 3]
RECEIVER
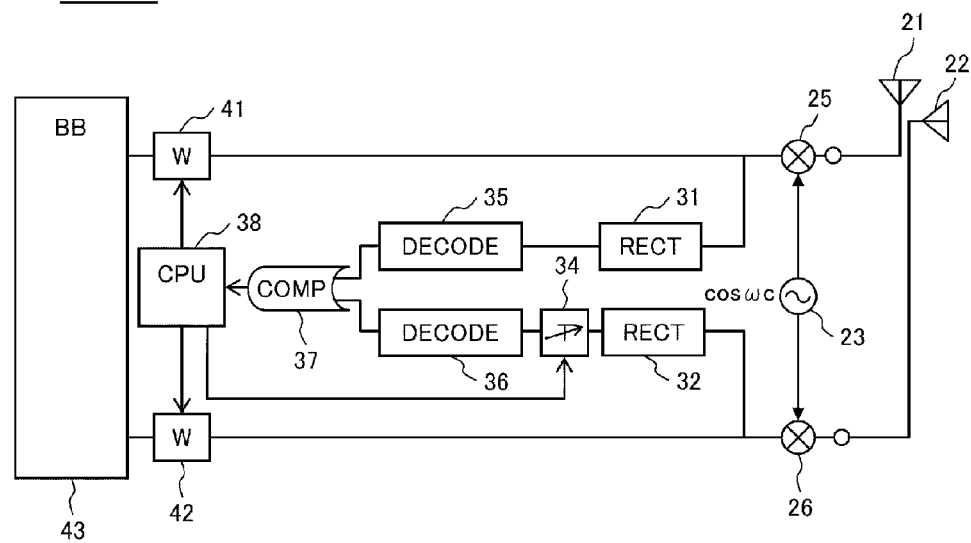

[Fig. 4]
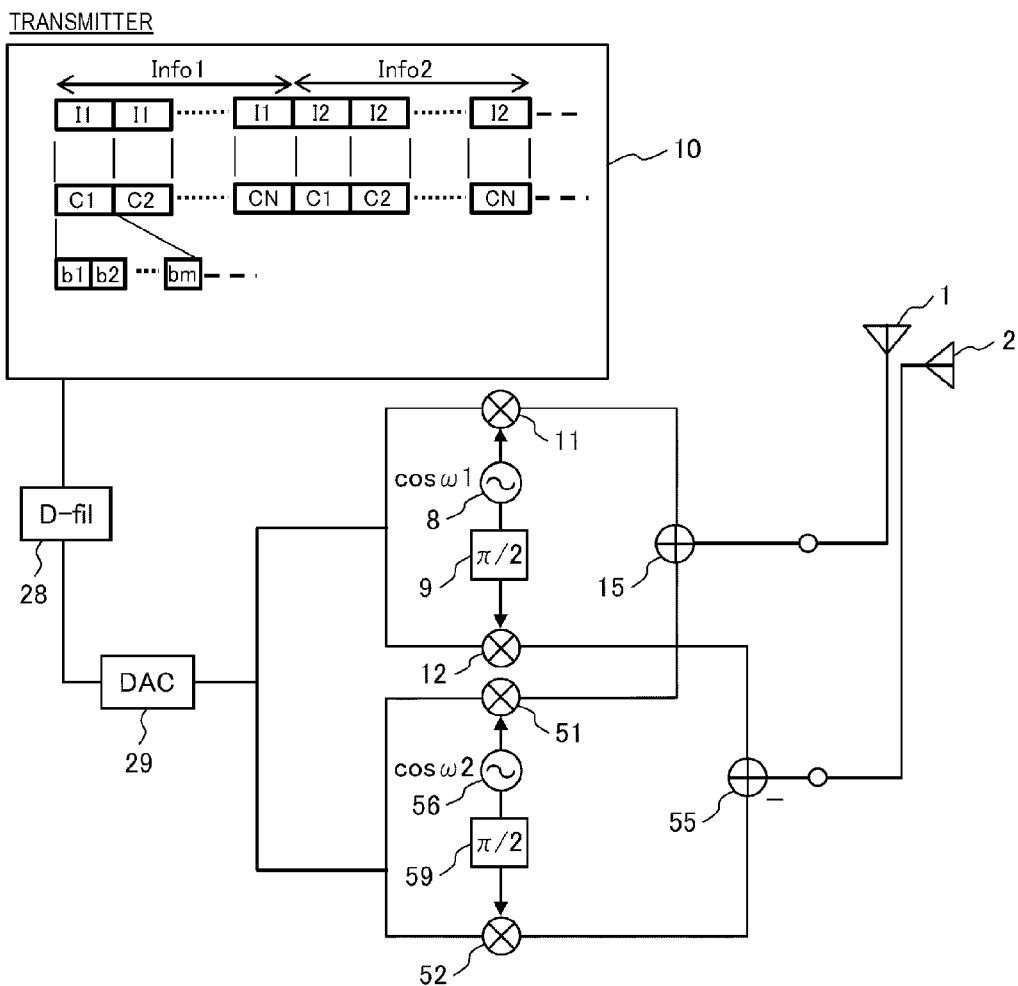

[Fig. 5]
RECEIVER
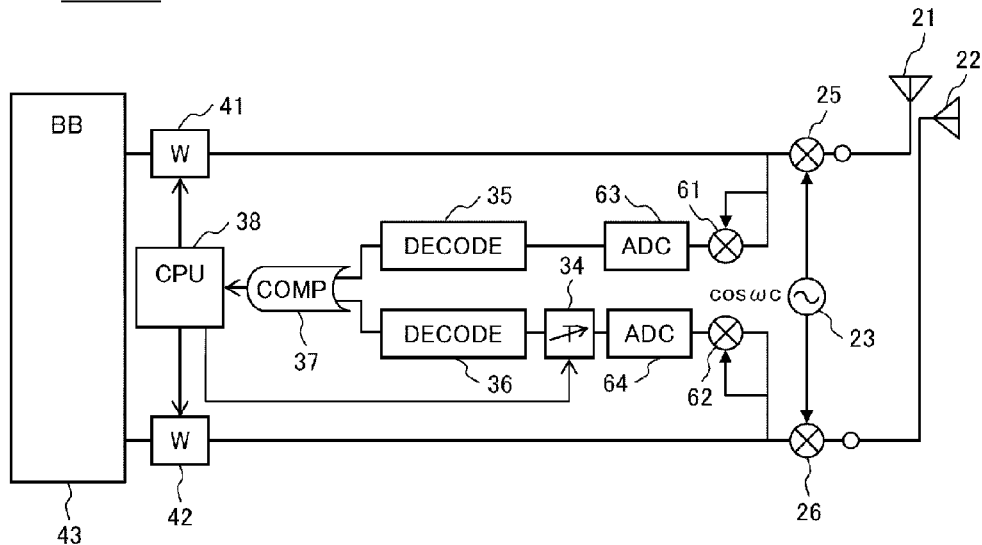
[Fig. 6]
TRANSMITTER
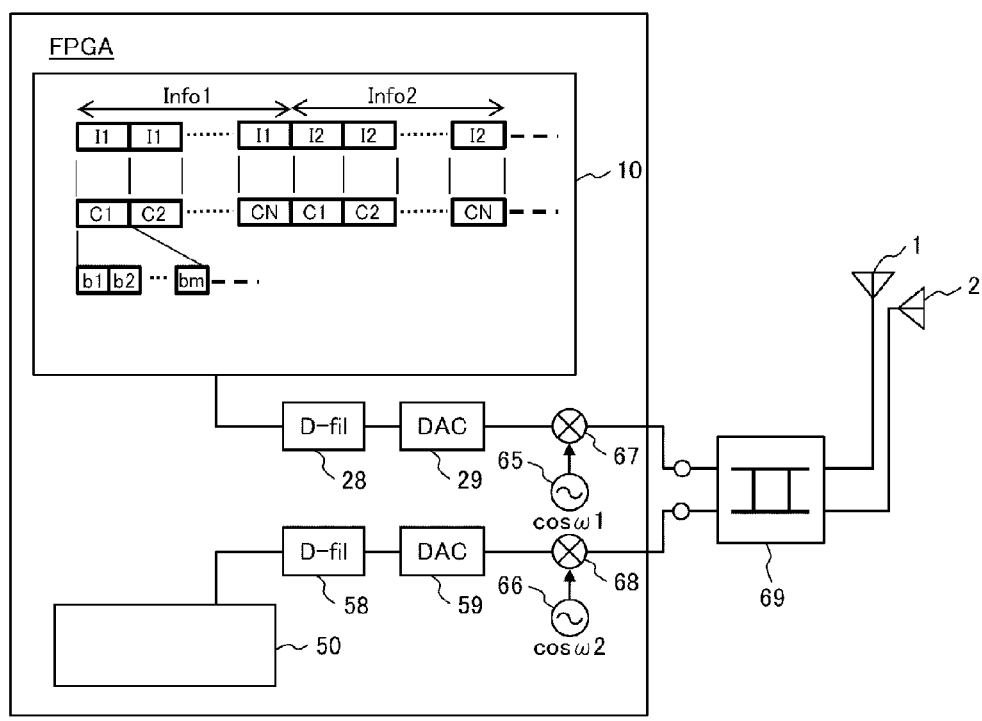

[Fig. 7]
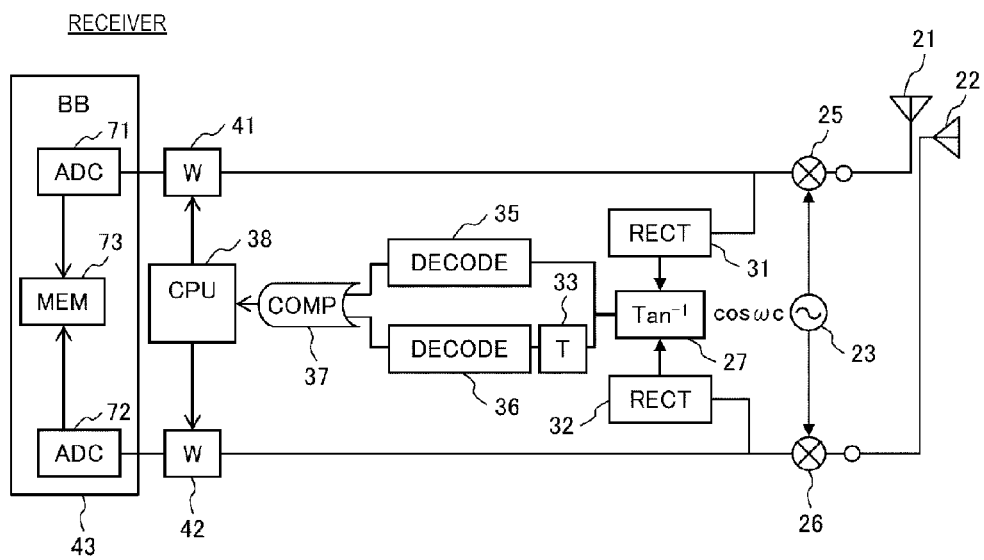

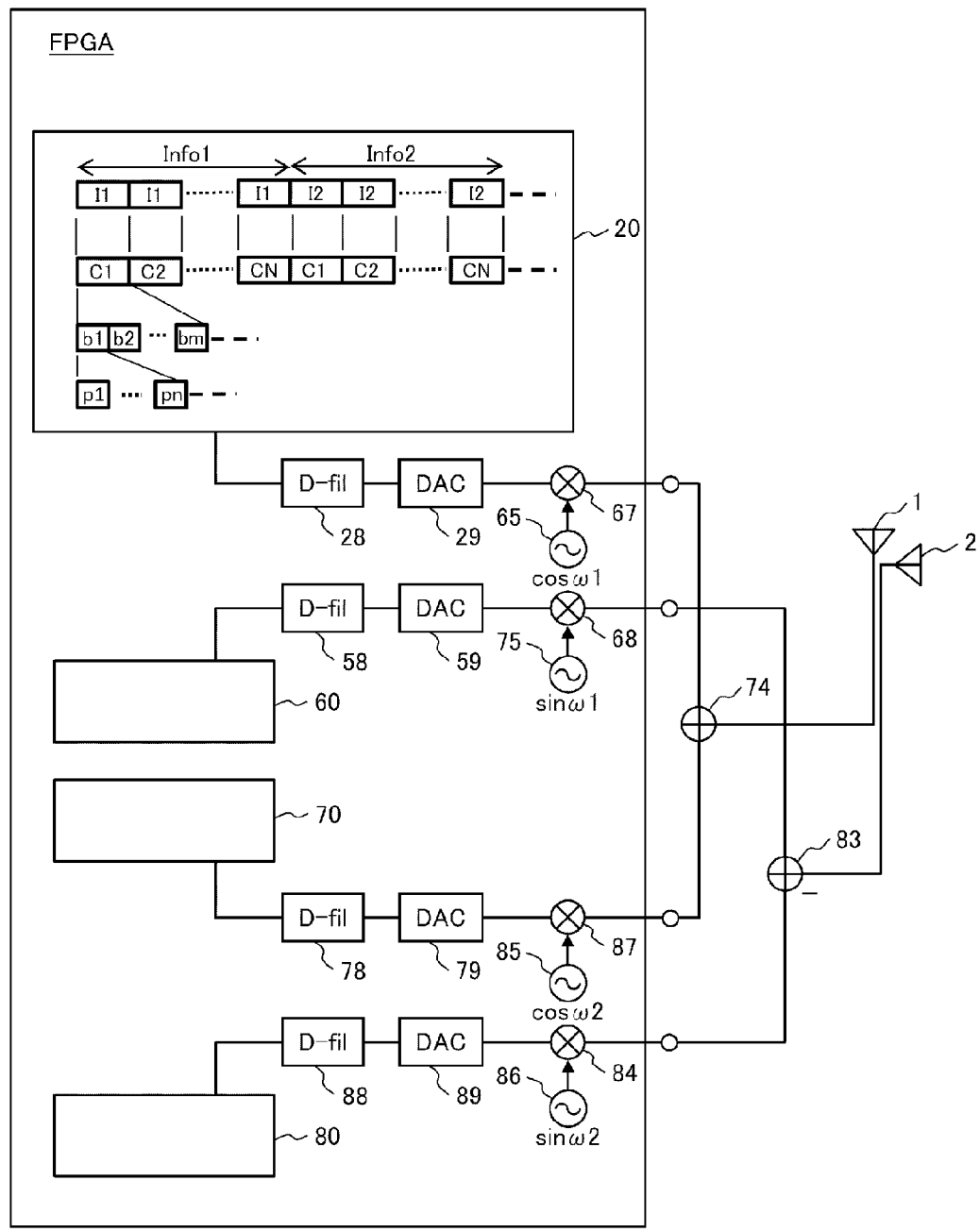
[Fig. 8]

[Fig. 9]
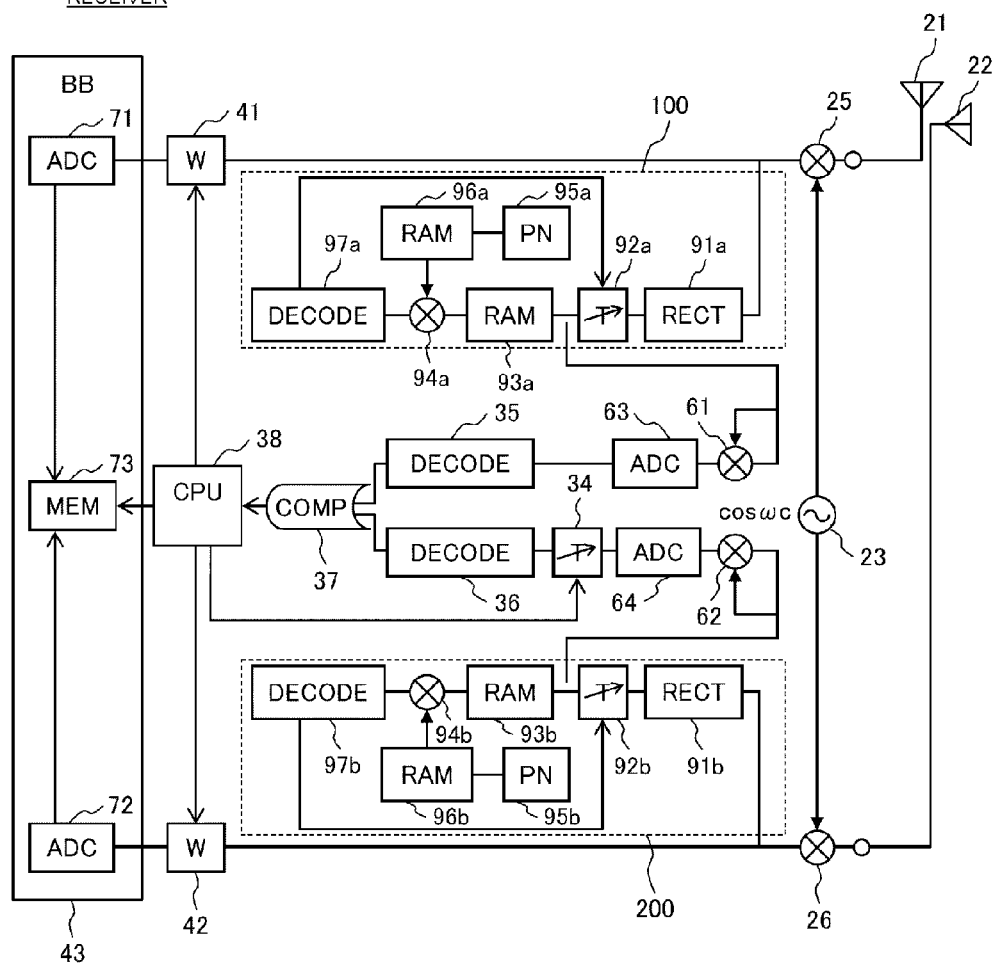

[Fig. 10]
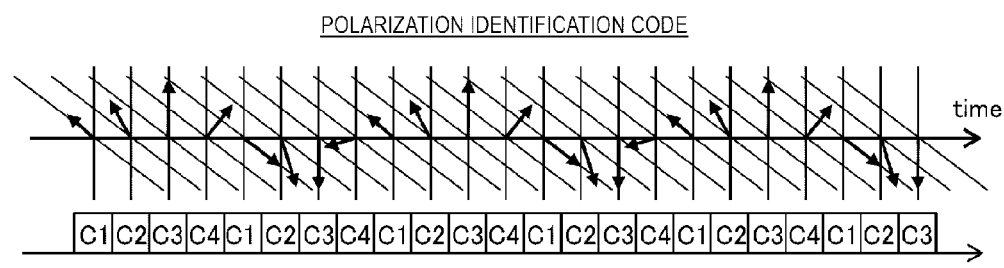

[Fig. 11]
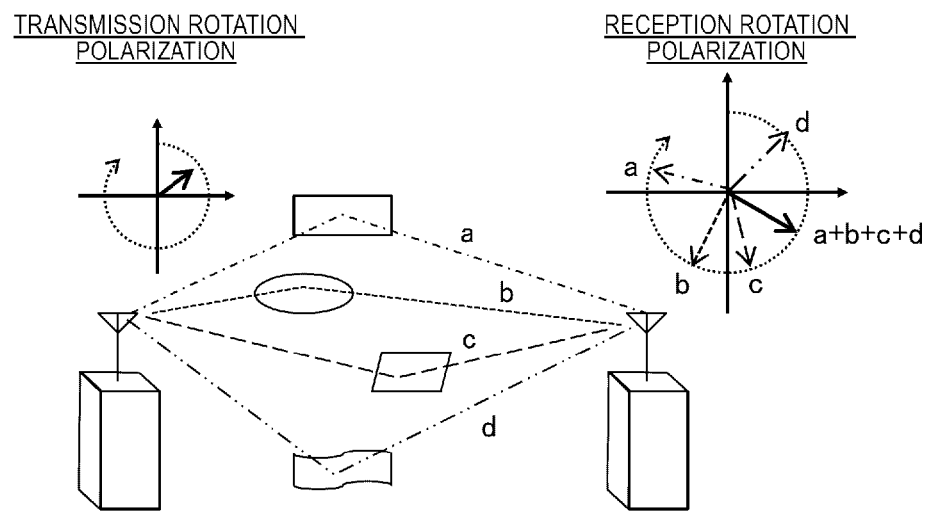
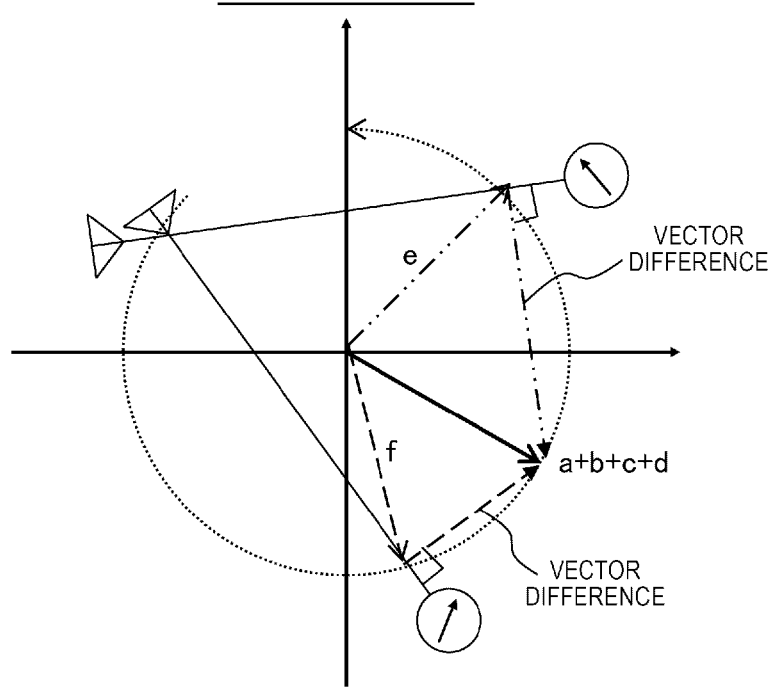

[Fig. 12]
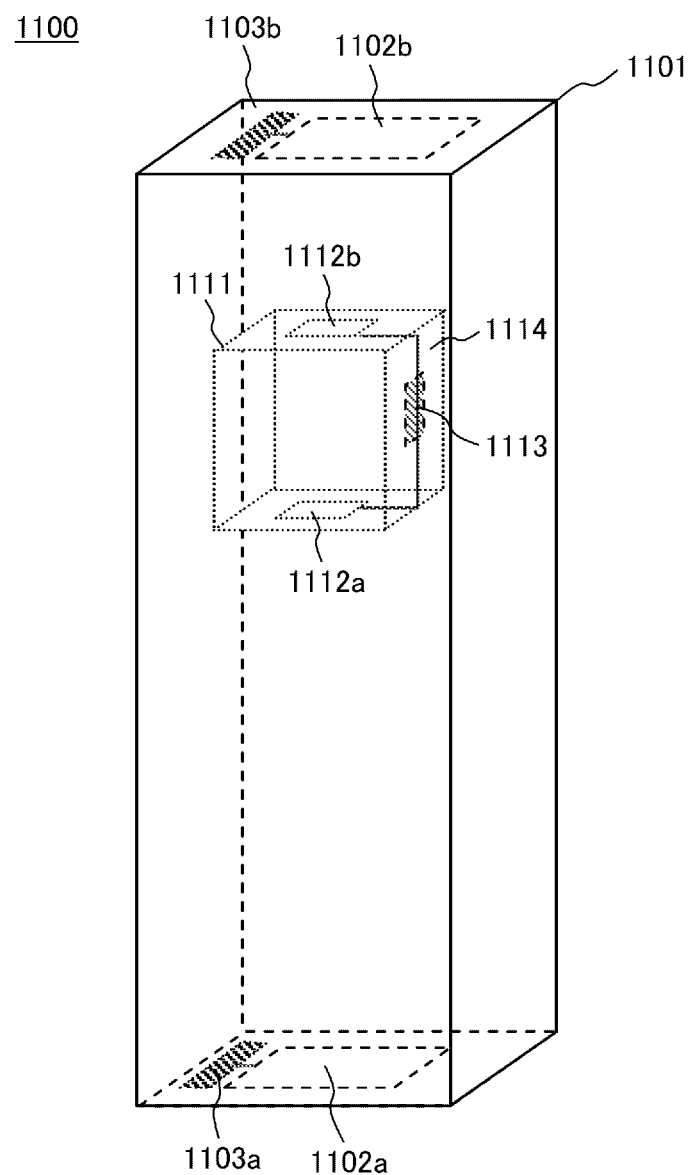

[Fig. 13]
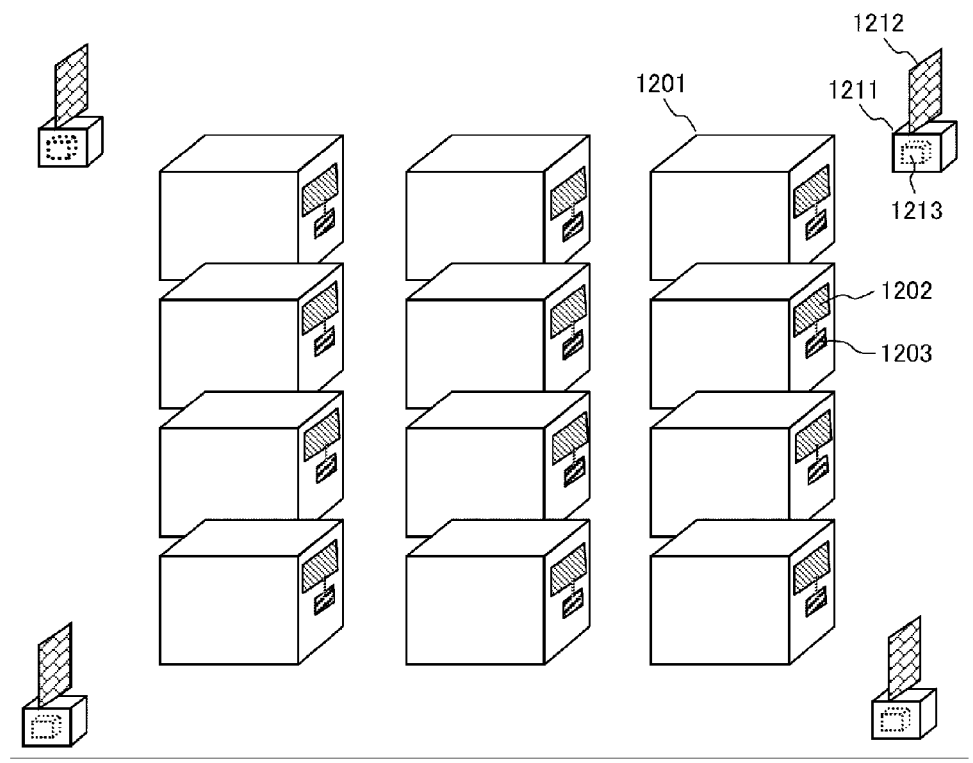

WIRELESS COMMUNICATION SYSTEM

TECHNICAL FIELD

The present invention relates to a wireless communication system that performs communication using a radio signal between a transmitter and a receiver.

BACKGROUND ART

Power plants, water purification plants, and oil refineries that are lifelines as a base of social life, and power transmission and distribution systems, water distribution systems and transportation systems associated therewith are required to be worldwide enhanced with the population growth and the improvement of a standard of living. In order to cope with such a situation, various equipment that becomes the lifeline becomes large in size, and the number of power generation equipment, water purification equipment, oil refining equipment, substation equipment, water distribution equipment, or pipelines steadily increases in individual systems or individual plant. For efficient operation of the system or the plant and ensuring of safety, a need for technology for coupling individual equipment to a network to recognize a situation of each equipment or control each equipment has been advocated. In building such a network, wired technology and wireless technology are applicable and have respective characteristics, and accordingly, both are used selectively or in combination depending on a function or performance required by each system and each plant.

Since a network to which wireless technology is applied, that is, a wireless network does not require hardware such as wires between respective equipment, there are advantages that it is easy to introduce the wireless network and a cost of installation is low. Since a plurality of transmission paths of the wireless network are automatically formed from a transmission end to a reception end in a free space by electromagnetic waves, the wireless network is advantageous to improve reliability of communication based on transmission path multiplexing. Further, since a specific transmission path is invisible, it is difficult to specify the transmission path, and a possibility that an entire system is disabled due to blocking of the transmission path by an outsider is significantly lower as compared to a network to which wired technology is applied. On the other hand, since the transmission path is open to outsiders, concealment of information through the transmission path and detection of an action of the outsiders tampering a specific transmission path is generally difficult as compared to the network to which the wired technology is applied. Therefore, it is necessary to improve confidentiality using an encrypting technology or the like.

When a wireless network is applied to a system or a plant that becomes a lifeline, a frequency of electromagnetic waves that can efficiently propagate through a free space is limited to approximately 300 MHz to 3 GHz, and accordingly, dimensions of various equipment are several times or more greater than a wavelength of electromagnetic waves used by the wireless network. Therefore, the electromagnetic waves are reflected by the equipment, and a plurality of transmission paths are formed by a plurality of reflections between the reception end and the transmission end. The electromagnetic waves are transverse waves and have a vector component called a polarization in a direction orthogonal to a traveling direction. When the electromagnetic waves are reflected, a direction of polarization varies depending on an angle of incidence, and a phase of the electromagnetic waves varies depending on a path length of electromagnetic waves generated in a transmission end and a reception end by a plurality of reflected waves. Accordingly, there is a problem in that a vector sum of a plurality of electromagnetic waves arriving at the reception end is significantly reduced and quality of communication between transmission and reception is degraded.

As technologies for solving such problems, technologies described in PTL 1 to PTL 4 are known.

In the technology described in PTL 1, a plurality of rotation polarizations having different rotational speeds modulated with the same signal are transmitted. Accordingly, a situation of a vector sum of a plurality of electromagnetic waves arriving at a reception end is changed, and degradation of quality of communication between transmission and reception is prevented.

In the technology described in PTL 2, quadrature modulation is performed on transmission waves so as to change a modulation scheme according to a percentage of orthogonal components of the electromagnetic waves arriving at a reception end. That is, when a vector sum of the electromagnetic waves in the reception end is reduced, an amount of information transmitted from a transmission end is increased so as to prevent degradation of communication quality.

In the technology described in PTL 3, a polarization of transmission waves is rotated, and a rotation frequency is changed and selected so that a vector sum of a plurality of electromagnetic waves arriving at a reception end is not reduced. Accordingly, degradation of quality of communication between transmission and reception is prevented.

In the technology described in PTL 4, a beam of a strong directivity antenna is mechanically rotated using the strong directivity antenna so as to change a situation of a vector sum of a plurality of electromagnetic waves arriving at a reception end. Accordingly, degradation of quality of communication between transmission and reception is prevented.

CITATION LIST

Patent Literature

PTL 1: International Publication No. WO2013/140457
PTL 2: JP-A-2007-150646
PTL 3: JP-A-2002-513537
PTL 4: JP-A-10-332805

SUMMARY OF INVENTION

Technical Problem

In the related art described above, when wireless communication is performed between transmission and reception, communication quality degradation at the reception end occurring due to a propagation environment of electromagnetic waves between transmission and reception can be prevented, but it is difficult to detect and compensate for the communication quality degradation due to propagation environment modification from the outside occurring abnormally.

The present invention provides a wireless communication system capable of detecting propagation path modification from the outside and compensating for degradation of quality of communication between transmission and reception with respect to the propagation path modification.

Solution to Problem

In order to solve the above problems, a wireless communication system according to the present invention includes a transmitter that transmits electromagnetic waves in which a polarization direction rotates according to a signal in which data is loaded on a carrier, and a receiver that receives the electromagnetic waves and demodulates or reproduces the data, in which the transmitter imparts angle information indicating a polarization direction for transferring the data to the signal, and sets a rotation frequency of the polarization direction to a frequency lower than a frequency of the carrier, and the receiver changes the polarization direction of the received electromagnetic waves, based on the angle information transferred by the electromagnetic waves.

Advantageous Effects of Invention

The receiver can detect propagation path modification from the outside using the angle information of the polarization direction transferred by electromagnetic waves from the transmitter, and compensate for degradation in quality of communication between transmission and reception by changing the polarization direction of the received electromagnetic waves when the modification is detected.

Objects, configurations, and effects other than those described above will become apparent from the following description of embodiments.

BRIEF DESCRIPTION OF DRAWINGS

FIG. 1 illustrates a configuration diagram of a wireless communication system that is Embodiment 1 of the present invention.

FIG. 2 illustrates a configuration diagram of a transmitter in a wireless communication system that is Embodiment 2 of the present invention.

FIG. 3 illustrates a configuration diagram of a receiver of the wireless communication system that is Embodiment 3 of the present invention.

FIG. 4 illustrates a configuration diagram of a transmitter of a wireless communication system that is Embodiment 4 of the present invention.

FIG. 5 illustrates a configuration diagram of a receiver of a wireless communication system that is Embodiment 5 of the present invention.

FIG. 6 illustrates a configuration diagram of a transmitter of a wireless communication system that is Embodiment 6 of the present invention.

FIG. 7 illustrates a configuration diagram of a receiver of a wireless communication system that is Embodiment 7 of the present invention.

FIG. 8 illustrates a configuration diagram of a transmitter of a wireless communication system that is Embodiment 8 of the present invention.

FIG. 9 illustrates a configuration diagram of a receiver of a wireless communication system that is Embodiment 9 of the present invention.

FIG. 10 illustrates correspondence between rotation of a polarization direction of electromagnetic waves and polarization identification code.

FIG. 11 is a schematic diagram illustrating an example of calculation content in a calculation circuit.

FIG. 12 illustrates a configuration diagram of an elevator system that is Embodiment 10 of the present invention.

FIG. 13 illustrates a configuration diagram of a substation equipment surveillance system that is Embodiment 11 of the present invention.

DESCRIPTION OF EMBODIMENTS

Hereinafter, embodiments of the present invention will be described with reference to the accompanying drawings. Each embodiment relates to a wireless communication system that detects a propagation path modification action of an outsider and compensates for degradation of quality of communication between transmission and reception with respect to the same modification.

Embodiment 1

FIG. 1 illustrates a configuration diagram of a wireless communication system according to Embodiment 1 of the present invention.

A transmitter includes a digital data generation circuit (DATA) 3, and a transmission polarization angle identification code generation circuit (CODE) 4. A polarization angle identification code output from the transmission polarization angle identification code generation circuit 4 is superimposed on digital data output from the digital data generation circuit 3 by a first transmission multiplier 5, and an output thereof is branched in two. A first branch of the output of the first transmission multiplier 5 is multiplied by the output of the polarization rotation frequency generation circuit 6 by a second transmission multiplier 11, and a result thereof, that is, an output of the second transmission multiplier 11 is multiplied by an output (Frequency: $\omega_c$) of a transmission carrier frequency generation circuit 8 by a third transmission multiplier 13. An output of the third transmission multiplier is radiated as electromagnetic waves from a first transmission antenna 1 to a space. A second branch of the output of the first transmission multiplier 5 is multiplied by the output of the polarization rotation frequency generation circuit 6 by a fourth transmission multiplier 12 via a 90° phase shifter 7, and a result thereof is multiplied by the output of the transmission carrier frequency generation circuit 8 by a fifth transmission multiplier 14. An output of the fifth transmission multiplier 14 is radiated as electromagnetic waves from a second transmission antenna 2 spatially orthogonal to the first transmission antenna 1 to the space.

FIG. 10 illustrates correspondence between rotation of the polarization direction of the electromagnetic waves and the polarization identification code. Since the first transmission antenna 1 and the second transmission antennas 2 are spatially orthogonal to each other, the polarization direction of the electromagnetic waves radiated from the antennas to a space is rotated over time at a frequency set by the polarization rotation frequency generation circuit 6, that is, a frequency $\omega_p$ ($<\omega_c$) of a signal output from the polarization rotation frequency generation circuit 6, as illustrated in FIG. 10. The transmission polarization angle identification code generation circuit 4 is synchronized with the polarization rotation frequency generation circuit 6 and assigns a code indicating the angle information to each predetermined fixed polarization angle (45° in FIG. 10). In Embodiment 1, as illustrated in FIG. 10, four different pieces of code data (C1 to C4) are assigned corresponding to four different polarization angles. Here, the same code is assigned to polarization angles having a difference of 180°. Through this assignment of the code data, information indicating a plurality of specific polarization directions is placed on the carrier. Therefore, the electromagnetic waves radiated from the antenna transfer information indicating a specific polarization direction of the rotation polarization together with the digital data to the receiver.

The receiver includes a first reception antenna 21, and a second reception antenna 22 spatially orthogonal to the first reception antenna 21. An output of the first reception antenna 21 is multiplied by an output of a reception carrier frequency generation circuit 23 by a first reception multiplier 25, and a result thereof is divided in two. A first branch is input to a first detection circuit (RECT) 31, and a second branch is input to a first weighting circuit 41. An output of the second reception antenna 22 is multiplied by an output of the reception carrier frequency generation circuit 23 by a second reception multiplier 26, and a result thereof is branched in two. A first branch is input to a second detection circuit (RECT) 32, and a second branch is input to a second weighting circuit 42.

An output of the first detection circuit 31 and an output of the second detection circuit 32 are input to a polarization angle detection circuit ($Tan^{-1}$) 27, and an output thereof is branched in two. A first branch is input to a first decoder (DECODE) 35, and a second branch is input to a second decoder (DECODE) 36 via a delay circuit (T) 33. Respective outputs of the first and second decoders 35 and 36 become two inputs of a comparator (COMP) 37, and an output of the comparator 37 is input to a calculation circuit (CPU) 38. Weighting factors of the first weighting circuit (W) 41 and the second weighting circuit (W) 42 are controlled according to a calculation result of the calculation circuit 38, and respective outputs of the first and second weighting circuits 41 and 42 are input to a baseband circuit (BB) 43.

Electromagnetic waves in which the polarization rotates are automatically spread to a space and arrive at the receiver as a plurality of arrival waves via a plurality of propagation paths. The receiver can divide and receive a composite vector of a plurality of arriving electromagnetic waves into two orthogonal components using the first reception antenna 21 and the second reception antenna 22 which are spatially orthogonal to each other. The carrier frequency ($\omega_c$) is superimposed on each of the two orthogonal components. Accordingly, a rotation frequency component of the polarization is extracted, and an envelope that is a trajectory of the polarization rotation of the electromagnetic waves is detected for each orthogonal component by two detection circuits. A direction of the envelope, that is, the polarization direction (polarization angle) of the composite wave of the electromagnetic waves arriving at the receiver is detected from the two detected quadrature components by the polarization angle detection circuit 27.

The decoder associates the polarization direction detected by the polarization angle detection circuit 27 with a specific polarization direction of the electromagnetic waves transmitted by the transmitter. That is, the first decoder 35 extracts the code data (C1 to C4) from the polarization direction detected by the polarization angle detection circuit 27, and associates the specific polarization direction of the polarization of the electromagnetic waves transmitted by the transmitter, which is indicated by the extracted code data, with the polarization direction detected by the polarization angle detection circuit 27. The second decoder 36 similarly outputs the polarization direction of the received electromagnetic waves associated with the polarization direction of the electromagnetic waves transmitted by the transmitter, but the polarization direction output by the second decoder 36 and the polarization direction output by the first decoder 35 have a time difference set by the delay circuit 33. Therefore, by the comparator 37 comparing the polarization directions output by the first and second decoders 35 and 36 with each other, it is possible to detect a temporal change in the polarization direction of the electromagnetic waves received by the receiver.

If the propagation path between the transmitter and the receiver is normal, the temporal change in the polarization direction detected in the receiver is uniform. If an abnormal change in the propagation path between the transmitter and the receiver occurs, that is, when the modification from the outside is performed, the temporal change in the polarization direction detected in the receiver becomes non-uniform. Therefore, in the receiver, by detecting the non-uniform time change, it is possible to detect the modification of the propagation path from the outside. In this embodiment 1, the calculation circuit 38 holds and records information on the normal and abnormal temporal changes in the polarization direction output by the comparator 37, in real time, and performs calculation to determine what modification occurs using the data of the normal temporal change held so far when detecting the abnormal change. The calculation circuit 38 controls the weighting coefficients of the first and second weighting circuits (W) 41 and 42 based on the calculation result to adjust weights for the received signals of the first and second reception antennas 21, that is, gains of both of the antennas. Accordingly, the abnormal change in the polarization direction of the electromagnetic waves due to the modification can be compensated and degradation of the communication quality can be suppressed.

FIG. 11 is a schematic diagram illustrating an example of calculation content in the calculation circuit 38, and illustrates transmission rotation polarization, reception rotation polarization, and a reception antenna power combination method.

A transmission rotation polarization transmitted from the transmitter propagates in paths indicated by a one-dot chain line, a dotted line, a dashed line, and a two-dot chain line and arrives at the receiver in an upper diagram of FIG. 11. When reception rotation polarizations propagating in the paths indicated by the one-dot chain line, the dotted line, the dashed line, and the two-dot chain line and arriving at the receiver are vectors a, b, c, and d, the reception rotation polarization at the time of normal temporal change in the polarization direction is indicated by a composite vector a+b+c+d indicated by a solid arrow. That is, a direction of the composite vector a+b+c+d indicates a direction of the reception rotation polarizations at the time of normal temporal change in the polarization direction to be detected by the receiver.

If an abnormal change in the polarization direction is detected, that is, the propagation path has been modified, for example, the polarization direction slips from a direction of the composite vector a+b+c+d to a direction of a vector f indicated by a dashed arrow or a vector e indicated by a two-dot chain line arrow, as illustrated in a lower diagram of FIG. 11. The calculation circuit 38 calculates a difference between the composite vector a+b+c+d and the slipped vector (f or e). A vector of the difference that is a result of the calculation is an influence of the modification from the outside. In order to remove this influence and ensure communication quality, the transmitted rotation polarization may be received by the antenna having a polarization in a direction perpendicular to a direction of the vector of the difference. In this state, by controlling the weighting coefficients of the first and second weighting circuits (W) 41 and 42 to adjust a gain of the first reception antenna 21 and a gain of the second reception antennas 22 as described above, setting is achieved without changing the direction of the antennas.

The calculation circuit 38 sequentially stores data of a temporal change in the direction of the detected polarization, and estimates a direction of a normal polarization from stored past data.

According to Embodiment 1, since the modification from the outside applied to the propagation path between the transmitter and the receiver can be detected and an influence of the modification can be eliminated, it is possible to compensate for degradation of communication quality of the received signal due to the propagation path modification from the outside.

Embodiment 2

FIG. 2 illustrates a configuration diagram of a transmitter in a wireless communication system that is Embodiment 2 of the present invention. A receiver is the same as that in any one of Embodiment 1, and Embodiments 3, 5, 7, and 9 to be described below.

The transmitter includes a digital data generation circuit 3 and a transmission polarization angle identification code generation circuit 4. A polarization angle identification code output from the transmission polarization angle identification code generation circuit (CODE) 4 is superimposed on digital data output from the digital data generation circuit (DATA) 3 by a first transmission multiplier 5, and an output thereof is branched in two.

A first branch of the output of the first transmission multiplier 5 is further branched in two, one of the branches is multiplied by an output (frequency: $\omega_1$) of a first transmission carrier frequency generation circuit 8 by a second transmission multiplier 11, and a result thereof becomes a first input of a transmission adder 15. In the other branch, the output of the first transmission carrier frequency generation circuit 8 is multiplied by a second transmission multiplier 12 via a 90° phase shifter 9, and a result thereof becomes a first input of a transmission subtractor 55.

A second branch of the output of the first transmission multiplier 5 is further branched in two, one of the branches is multiplied by an output (frequency: $\omega_2$ ($<\omega_1$ or $>\omega_1$)) of a second transmission carrier frequency generation circuit 56 by a seventh transmission multiplier 51, and a result thereof becomes a second input of the transmission adder 15. In the other branch, the output of the second transmission carrier frequency generation circuit 56 is multiplied by an eighth transmission multiplier 52 via a 90° phase shifter 59, and a result thereof becomes a second input of the transmission subtractor 55.

An output of the transmission adder 15 is radiated to a space from a first transmission antenna 1, and an output of the transmission subtractor 55 is radiated from a second transmission antenna 2 spatially orthogonal to the first transmission antenna to the space.

In Embodiment 2, electromagnetic waves in which the polarization rotates can be generated, similar to Embodiment of FIG. 1. However, there is a correspondence relationship $\omega_c=(\omega_1+\omega_2)\times(\frac{1}{2})$ and $\omega_p=|\omega_1-\omega_2|\times(\frac{1}{2})$ between the carrier frequency $\omega_c$ and the polarization rotation frequency $\omega_p$ in Embodiment 1 and the first frequency $\omega_1$ and the second frequency $\omega_2$ in Embodiment 2.

According to Embodiment 2, since the number of multiplications until the digital data is radiated to a space can be reduced, it is possible to reduce a spurious frequency generated by the transmitter. Further, since the carrier frequency $\omega_c$ and the polarization rotation frequency $\omega_p$ having very different magnitude are generated by the first frequency $\omega_1$ and the second frequency $\omega_2$ having the same magnitude, digital signal processing is easy.

Embodiment 3

FIG. 3 illustrates a configuration diagram of a receiver in a wireless communication system that is Embodiment 3 of the present invention. A transmitter is the same as that in any one of Embodiments 1 and 2 and Embodiments 4, 6, and 8 to be described below.

The receiver includes a first reception antenna 21, and a second reception antenna 22 spatially orthogonal to the first reception antenna 21, and an output of the first reception antenna 21 is multiplied by an output (Frequency: $\omega_c$) of a reception carrier frequency generation circuit 23 by a first reception multiplier 25, a resultant signal is branched in two, a first branch is input to a first detection circuit (RECT) 31, and a second branch is input to a first weighting circuit (W) 41. An output of the second reception antenna 22 is multiplied by the output of the reception carrier frequency generation circuit 23 by a second reception multiplier 26, a resultant is branched in two, a first branch is input to a second detection circuit (RECT) 32 and a second branch is input to a second weighting circuit (W) 42. An output of the first detection circuit 31 is input to a first decoder (DECODE) 35, and an output of the second detection circuit 32 is input to a second decoder 36 (DECODE) via a variable delay circuit 34. Outputs of the first and second decoders 35 and 36 become two inputs of a comparator (COMP) 37, and an output of the comparator 37 is input to a calculation circuit 38 (CPU). Similar to the receiver of Embodiment 1, the variable delay circuit 34 and weighting coefficients of the first weighting circuit 41 and the second weighting circuit 42 are controlled using a result of the calculation of the calculation circuit 38, and outputs of the first and second weighting circuits 41 and 42 are input to a baseband circuit (BB) 43.

Electromagnetic waves in which the polarization rotates are automatically spread to a space and arrive at the receiver as a plurality of arriving waves via a plurality of propagation paths. The receiver can divide and receive a composite vector of a plurality of arriving electromagnetic waves into two orthogonal components using the first reception antenna 21 and the second reception antenna 22 which are spatially orthogonal to each other. The carrier frequency $\omega_c$ is superimposed on each of the orthogonal components. Accordingly, a rotation frequency component of the polarization is extracted, and an envelope that is a trajectory of the polarization rotation of the electromagnetic waves is detected for each orthogonal component by two detection circuits. Since information on the polarization angle of the electromagnetic waves transmitted by the transmitter is included in a signal of the detected envelope, the information on the polarization angle is extracted by the decoder. Accordingly, a specific polarization angle of the transmitted waves and the rotation angle of the polarization indicated by the envelope can be associated with each other.

The calculation circuit 38 detects and stores the normal temporal change in the polarization direction detected by the receiver for a plurality of specific polarization angles of the transmitted waves. When an abnormal temporal change is detected for the plurality of specific polarization angles of the transmitted waves, the calculation circuit 38 determines that modification from the outside is performed on the propagation path formed between the transmitter and the receiver. Further, in order to increase accuracy of detection of the abnormal temporal change, the calculation circuit 38 controls the variable delay circuit 34 to set different time differences in two envelope components of the two signals from the two orthogonal antennas for detecting the temporal change, and detects a normal temporal change in the polarization direction detected by the receiver.

In Embodiment 3, angle information is extracted for each of two orthogonal polarization components instead of omitting a non-linear calculation circuit such as the polarization angle detection circuit illustrated in FIG. 1. That is, in Embodiment 3, the direction of polarization for specifying the polarization direction of the electromagnetic waves transmitted by the transmitter is increased, and a difference distance between two signals for detecting abnormality of the polarization rotation of the received signal is increased instead of omitting the non-linear calculation circuit.

According to this embodiment, since circuit elements having strong nonlinearity can be omitted, it is possible to simplify a device configuration or reduce the cost for device manufacture.

Embodiment 4

FIG. 4 illustrates a configuration diagram of a transmitter in a wireless communication system that is Embodiment 4 of the present invention. A receiver is the same as that in any one of Embodiments 1 and 3, and Embodiments 5, 7, and 9 to be described below.

Primary units of the transmitter of Embodiment 4 are the same as those of the transmitter of Embodiment 2 illustrated in FIG. 2. Further, in this embodiment 4, a digital signal in which digital data and a polarization angle identification code coexist is generated by a digital signal processing circuit 10, frequency components of an output of the digital signal processing circuit 10 are limited by a digital filter (D-fil) 28, and a resultant signal is converted to an analog signal by a digital-to-analog converter 29 (DAC), unlike Embodiment 2. The digital signal processing circuit 10 generates a digital signals (Info1 and Info2) including a periodic polarization angle identification code in digital data having a long period.

In Embodiment 4, since the digital signal in which the digital data and the polarization angle identification code coexist is collectively subjected to frequency filtering, the digital signal can be generated in a narrow occupied frequency band. Accordingly, the frequency components of the signal radiated by the transmitter can be reduced and signal processing time of the receiver can be reduced, it is possible to reduce power consumption of the wireless communication system.

Embodiment 5

FIG. 5 illustrates a configuration diagram of a receiver of a wireless communication system that is Embodiment 5 of the present invention. A transmitter is the same as that in any one of Embodiments 1, 2, 4 and Embodiments 6 and 8 to be described below.

Primary units of the receiver of Embodiment 5 are the same as those of the receiver of Embodiment 3 illustrated in FIG. 3. Further, in this embodiment 5, a cascade connection of a squaring circuits 61 and an analog-to-digital converter (ADC) 63, and a cascade connection of a squaring circuit 62 and an analog-to-digital converter (ADC) 64 are used in place of the detection circuits 31 and 32, unlike Embodiment 3. The cascade connection of the squaring circuits and the analog-to-digital converter is a digital circuit capable of executing the same operation as the detection circuit that is an analog circuit. Accordingly, according to Embodiment 5, since analog circuit elements can be reduced, it is possible to improve resistance to temperature change and aging of the device.

Embodiment 6

FIG. 6 illustrates a configuration diagram of a transmitter in a wireless communication system that is Embodiment 6 of the present invention. A receiver is the same as that in any one of Embodiments 1, 3, and 5 and Embodiments 7 and 9 to be described below.

The transmitter includes a first digital signal processing circuit 10. Digital data including a polarization angle identification code output from the first digital signal processing circuit 10 becomes an input of a first digital-to-analog converter (DAC) 29 via a first digital filter (D-fil) 28, an output (frequency: $\omega_1$) of a first carrier frequency generation circuit 65 is superimposed on an output of the first digital-to-analog converter 29 by a first multiplier 67, and a resultant signal becomes a first input of a hybrid circuit 69. Digital data including a polarization angle identification code output from a second digital signal processing circuit 50 similar to the first digital signal processing circuit 10 becomes an input of a second digital-to-analog converter (DAC) 59 via a second digital filter (D-fil) 58, an output of a second carrier frequency generation circuit 66 (frequency: $\omega_2$ ($\neq \omega_1$)) is superimposed on an output of the second digital-to-analog converter 59 by a second multiplier 68, and a resultant signal becomes a second input of the hybrid circuit 69.

A first output of the hybrid circuit 69 is coupled to a first transmission antenna 1, and a second output of the hybrid circuit 69 is coupled to a first second transmission antenna 2 spatially orthogonal to the first transmission antenna 2. The first and second transmission antennas 1 and 2 radiate electromagnetic waves having a polarization rotating at a half the frequency of a difference between the two carrier frequencies ($\omega_1$ and $\omega_2$) to a space. An effective carrier frequency ($\omega_c$) of the polarization is a half a frequency of a sum of the two carrier frequencies ($\omega_1$ and $\omega_2$).

According to this embodiment 6, since the number of carrier frequency generation circuits that are active circuits can be reduced due to introduction of the hybrid circuit that is a passive circuit, it is possible to reduce the cost for device manufacture.

In this embodiment 6, as illustrated in FIG. 6, a circuit portion other than the transmission antennas (1 and 2) and the hybrid circuit 69 is mounted on a field programmable gate array (FPGA), but a mounting form is not limited thereto.

Embodiment 7

FIG. 7 illustrates a configuration diagram of a receiver of a wireless communication system that is Embodiment 7 of the present invention. A transmitter is the same as that in any one of Embodiments 1, 2, 4, and 6, and Embodiment 8 to be described below.

Primary units of the receiver of Embodiment 7 are the same as those of the receiver of Embodiment 3 illustrated in FIG. 3. Further, in this embodiment 7, a calculation circuit (CPU) 38 transfers and stores information on a normal temporal change and information on an abnormal temporal change in the polarization direction detected by the receiver to and in a storage circuit (MEM) 73 in a baseband circuit (BB) 43, and stores signals of orthogonal reception antennas in this case as digital data in the storage circuit 73 via a first analog-to-digital converter (ADC) 71 and a second analog-to-digital converter (ADC) 72 in the baseband circuit 43, unlike Embodiment 3.

A baseband signal including information stored in the storage circuit 73 is transferred to a transmitter (not illustrated) such that the baseband signal can be transmitted to the outside. Information on a normal temporal change and information on an abnormal temporal change in the polarization direction detected by the receiver includes a large amount of information on surroundings of the transmitter and the receiver. By analyzing this information, a variety of information including external interference with the wireless communication system is likely to be obtained. Therefore, according to this embodiment, since data regarding a temporal change in an external environment surrounding the wireless communication system is acquired and utilized, it is possible to expand a width of a countermeasure when the communication system fails.

Embodiment 8

FIG. 8 illustrates a configuration diagram of a transmitter in a wireless communication system that is Embodiment 8 of the present invention. A receiver is the same as that in anyone of Embodiments 1, 3, 5, and 7 and embodiments 9 to be described below, but the receiver in Embodiment 9 among them is suitable.

The transmitter includes a first digital signal processing circuit 20. The first digital signal processing circuit 20 generates a digital signal in which digital data, a polarization angle identification code, and a synchronization supplementary code coexist. In Embodiment 8, a so-called pseudo noise (PN) that is a type of orthogonal circulation code is used as the synchronous supplement data. Frequency components of an output of the first digital signal processing circuit 20 are limited by a first digital filter (D-fil) 28, and then a resultant signal is converted to an analog signal by a first digital-to-analog converter (DAC) 29. An output (frequency: $\omega_1$) of a first carrier frequency generation circuit 65 is superimposed on this analog signal by a first multiplier 67, and a resultant signal becomes a first input of an adder 74.

A second digital signal processing circuit 60 similar to the first digital signal processing circuit 20 generates a digital signal in which digital data, a polarization angle identification code, and a synchronization supplementary code coexist. Frequency components of an output of the second digital signal processing circuit 60 are limited by a second digital filter (D-fil) 58, and then a resultant signal is converted to an analog signal by a second digital-to-analog converter (DAC) 59. An output (frequency: $\omega_1$) of a first orthogonal carrier frequency generation circuit 75 is superimposed on this analog signal by a second multiplier 68, and a resultant signal becomes a first input of a subtractor 83.

A third digital signal processing circuit 70 similar to the first digital signal processing circuit 20 generates a digital signal in which digital data, a polarization angle identification code, and a synchronization supplementary code coexist. Frequency components of an output of the third digital signal processing circuit 70 is limited by a third digital filter (D-fil) 78, and then a resultant signal is converted to an analog signal by a third digital-to-analog converter (DAC) 79. An output (frequency: $\omega_2$) of a second carrier frequency generation circuit 85 is superimposed on this analog signal by a third multiplier 87, and a resultant signal becomes a second input of the adder 74.

A fourth digital signal processing circuit 80 similar to the first digital signal processing circuit 20 generates a digital signal in which digital data, a polarization angle identification code, and a synchronization supplementary code coexist. Frequency components of an output of the fourth digital signal processing circuit 80 are limited by a fourth digital filter (D-fil) 88, and then a resultant signal is converted to an analog signal by a fourth digital-to-analog converter (DAC) 89. An output (frequency: $\omega_2$) of a second orthogonal carrier frequency generation circuit 86 is superimposed on this analog signal by a fourth multiplier 84, and a resultant signal becomes a second input of the subtractor 83.

An output of the adder 74 is radiated as electromagnetic waves to the air from a first transmission antenna 1, and an output of the subtractor 83 is radiated as electromagnetic waves to the air from a second transmission antenna 2 orthogonal to the first transmission antenna 1. These electromagnetic waves are vector-combined, and propagate through the air as electromagnetic waves having a rotating polarization.

In Embodiment 8, each output of the first to fourth digital signal processing circuits 20, 60, 70, and 80 includes a periodic polarization angle identification code in digital data having a long period, and each bit of the polarization angle identification code is spread as a PN code. The receiver can easily synchronize with the transmitter using the PN code (see Embodiment 9). Further, since the hybrid circuit in a final stage is not required, it is possible to miniaturize the device, unlike Embodiment 6.

According to this embodiment 8, since synchronization between the transmitter and the receiver is easily established, it is possible to reliably detect the modification of the communication system from the outside, and reliably compensate for degradation of communication quality due to the alteration.

In this embodiment 8, a circuit portion other than the antennas (1 and 2), the adder 73, and the subtractor 83 is mounted on a field programmable gate array (FPGA) as illustrated in FIG. 8, but a mounting form is not limited thereto.

Embodiment 9

FIG. 9 illustrates a configuration diagram of a receiver of a wireless communication system that is Embodiment 9 of the present invention. A transmitter is the same as that in any one of Embodiments 1, 2, 4, 6, and 8, but the transmitter in Embodiment 8 among them is suitable.

In Embodiment 9, first and second circuits 100 and 200 that synchronize the transmitter and the receiver based on a PN code that is synchronization supplement data are provided in a stage before the squaring circuits 61 and 62 of Embodiment 5 in FIG. 5. A specific circuit configuration is as follows.

The receiver includes a first reception antenna 21, and a second reception antenna 22 spatially orthogonal to the first reception antenna 21. An output of the first reception antenna 21 is multiplied by an output of a reception carrier frequency generation circuit 23 by a first reception multiplier 25, and a result thereof is branched in two. A first branch is input to a first detection circuit (RECT) 91*a*, and a second branch is input to a first weighting circuit (W) 41.

An output of the second reception antenna 22 is multiplied by an output of the reception carrier frequency generation circuit 23 by a second reception multiplier 26, and a result thereof is branched in two. A first branch is input to a second detection circuit (RECT) 91*b*, and a second branch is input to a second weighting circuit (W) 42.

An output of a first detection circuit 91*a* is temporarily stored in a first buffer (RAM) 93*a* via a first variable delay unit 92*a*, and an output of a first PN code generation circuit 95*a* is stored in a third buffer (RAM) 96*a*. Content of the respective buffers is multiplied by each other by a first multiplier 94*a*. A result thereof, that is, an output of the first multiplier 94*a* is transferred to a first decoder (DECODE) 97*a*. A delay amount of the first variable delay unit 92*a* is adjusted so that a multiplication result is maximized, according to an output of the first decoder 97*a*. The output of the first variable delay unit 92*a* is input to a third decoder (DECODE) 35 via a cascade connection of a first squaring circuit 61 and a first analog-to-digital converter (DAC) 63. An output of the third decoder 35 becomes one input of a comparator (COMP) 37.

An output of a second detection circuit 91*b* is temporarily stored in a second buffer (RAM) 93*b* via a second variable delay unit 92*b*, and an output of a second PN code generation circuit 95*b* is stored in a fourth buffer (RAM) 96*b*. Content of the respective buffers is multiplied by each other by a second multiplier 94*b*. A result thereof, that is, an output of the second multiplier 94*b* is transferred to a second decoder (DECODE) 97*b*. A delay amount of the second variable delay unit 92*b* is adjusted so that a multiplication result is maximized, according to an output of the second decoder 97*b*. The output of the second variable delay unit 92*b* is input to a fourth decoder (DECODE) 36 via a third variable delay circuit 34, and a cascade connection of a second squaring circuit 62 and a second analog-to-digital converter 64. An output of the fourth decoder 36 becomes the other input of a comparator 37.

An output of the comparator 37 is input to a calculation circuit (CPU) 38, the variable delay circuit 34 and respective weighting coefficients of the first and second weighting circuits 41 and 42 are controlled by the calculation circuit 38, and outputs of the respective weighting circuits are input to a baseband circuit (BB) 43, similar to Embodiment 5. Further, the calculation circuit 38 detects information on a normal temporal change and information on an abnormal temporal change in the polarization direction, and transfers and stores the information to a storage circuit 73 in the baseband circuit 43. In this case, respective signals of the first and second reception antennas 21 and 22 that are orthogonal to each other, that is, respective outputs of the first and second weighting circuits 41 and 42 are stored as digital data in the storage circuit 73 of the baseband circuit 43 via third and fourth analog-to-digital converters 71 and 72 included in the baseband circuit 43.

In Embodiment 9, a baseband signal including the information stored in the storage circuit 73 can be transmitted to the outside by a transmitter (not illustrated), similar to Embodiment 7 in FIG. 7. Accordingly, according to Embodiment 9, since the data regarding a temporal change in an external environment surrounding the communication system can be acquired and utilized, a width of a countermeasure when the communication system fails can be widened. Further, in Embodiment 9, since the signal synchronization can be easily established between transmission and reception by the PN code, accuracy of detection of the normal temporal change and the abnormal temporal change in the polarization direction is improved.

Embodiment 10

FIG. 12 illustrates a configuration diagram of an elevator system according to Embodiment 10 of the present invention. A wireless communication system in which the present invention is implemented is applied to the elevator system.

In an elevator system 1100 of Embodiment 10, a cab 1111 is driven by a driving unit (not illustrated) and elevated inside a building 1101 (for example, within a hoistway). A base station wireless device 1103*a* including a transmitter and a receiver of the wireless communication system in which the present invention is implemented, and a base station two orthogonally polarized integral antenna 1102*a* connected to the base station wireless device 1103*a* are installed in a lower portion of the inside of the building 1101 (for example, a bottom of a pit in a lower portion of the hoistway). Further, a base station wireless device 1103*b* including a transmitter and a receiver of the wireless communication system in which the present invention is implemented, and a base station two orthogonally polarized integral antenna 1102*b* connected to the base station wireless device 1103*b* are installed in an upper portion of the inside of the building 1101 (for example, a top or an upper portion of the hoistway). A terminal station wireless device 1113 including the transmitter and the receiver of the wireless communication system in which the present invention is implemented is installed in a side portion of the cab 1111. Further, terminal station two orthogonally polarized integral antennas 1112*a* and 1112*b* connected to the terminal station wireless device 1113 are installed in an outer floor surface and an outer ceiling surface of the cab 1111, respectively. The two orthogonally polarized integral antennas 1112*a* and 1112*b* are connected to the terminal station wireless device 1113 using a high frequency cable 1114.

Here, the transmitter and the receiver in any one of Embodiments 1 to 9 described above may be applied as the base station wireless device 1103*a*, the base station wireless device 1103*b*, and the terminal station wireless device 1113.

By the base station wireless devices 1103*a* and 1103*b* and the terminal station wireless device 1113 communicating with each other, a control signal is provided from a control device (not illustrated) to a device included in the cab 1111, or a signal indicating a state of each device is transferred to the control device (not illustrated) or a surveillance device.

Since the base station wireless device 1103 and the terminal station wireless device 1113 use the inside of the building 1101 as a wireless transmission medium, the electromagnetic waves are subjected to multiple reflections by an inner wall of the building 1101 and the cab 1111, and a multi-wave interference environment is formed. In Embodiment 10, since the wireless communication system in which the present invention is implemented is applied, high-quality wireless transmission in which propagation path modification from the outside under the multi-wave interference environment is detected and degradation of quality of communication between transmission and reception is compensated for with respect to the modification can be realized. Thus, by using wireless connection means that uses the same wireless communications system, it is possible to remotely perform control or surveillance of the cab 1111 without using wired connection means. Accordingly, since wire connection means such as a communication cable in the elevator system is unnecessary, it is possible to save a space of the elevator system. That is, an elevator system having the same transportation capacity can be realized in a smaller building area, or improvement of the transportation capacity can be realized through an increase in an elevator dimension in the same building area.

Embodiment 11

FIG. 13 illustrates a configuration diagram of a substation equipment surveillance system that is Embodiment 11 of the present invention. A wireless communication system in which the present invention is implemented is applied to this substation equipment surveillance system.

A substation equipment surveillance system 1200 of Embodiment 11 includes a plurality of transformers 1201. A terminal station wireless device 1203 including a transmitter and a receiver of the wireless communication system in which the present invention is implemented, and a terminal station two orthogonally polarized integral antenna 1202 connected to the terminal station wireless device 1203 are installed in the transformer 1201. A plurality of base station devices 1211 less than the transformers 1201, which communicate with the terminal station wireless devices 1203, are provided near the plurality of transformers 1201. A base station wireless device 1213 including the transmitter and the receiver of the wireless communication system in which the present invention is implemented, and a base station two orthogonally polarized integral antenna 1212 connected to the base station wireless device 1213 are installed in the base station device 1211.

Here, the transmitter and the receiver in any one of Embodiments 1 to 9 described above may be applied as the base station wireless device 1213 and the terminal station wireless device 1203.

By the base station wireless device 1213 and the terminal station wireless device 1203 communicating with each other, a signal indicating a state of the transformer 1201 is transferred to a surveillance device (not illustrated), or a signal for controlling the transformer or a device associated therewith is transferred from a control device (not illustrated).

Since a dimension of the transformer is in the order of a few m and is greater than a wavelength corresponding to several GHz from several hundred MHz that is a frequency of the electromagnetic waves used by the wireless device, the electromagnetic waves is subjected multiple reflections by the plurality of transformers 1201 and a multi-wave interference environment is formed. In Embodiment 11, since the wireless communication system in which the present invention is implemented is applied, high-quality wireless transmission in which a propagation path modification action from the outside under the multi-wave interference environment is detected and degradation of quality of communication between transmission and reception is compensated for with respect to the modification can be realized. Accordingly, using wireless connection means that uses the same wireless system, the control and surveillance of the transformers 1201 can be remotely implemented by the plurality of wireless base stations 1211 without using wired connection means. Therefore, since a problem associated with high voltage inductive power when the wired connection means such as a cable is used is solved, it is possible to reduce cost for installation of a control and surveillance system. Therefore, it is possible to reduce the cost while ensuring the safety of the substation equipment surveillance system of.

The present invention is not limited to the embodiments described above, and various modification examples are included. For example, the above-described embodiments have been described in detail in order to clearly describe the present invention and are not limited to necessarily include all of the described configurations. Further, additions, removals, and replacements of other configurations may be made to some of the configurations of the respective embodiments.

For example, a mechanism that changes the direction of the antenna may also be applied in place of the weighting circuit in the receiver.

REFERENCE SIGNS LIST

1, 2: transmission antenna
3: digital data generation circuit
4: transmission polarization angle identification code generation circuit
5, 11, 12, 13, 14, 51, 52: transmission multiplier
6: polarization rotation frequency generation circuit
7, 9, 59: 90° phase shifter
8, 56: transmission carrier frequency generation circuit
10, 20, 50, 60, 70, 80: digital signal processing circuit
15: transmission adder
21, 22: reception antenna
23: reception carrier frequency generation circuit
25, 26: reception multiplier
27: polarization angle detection circuit
28, 58, 78, 88: digital filter
29, 59, 79, 89: digital-to-analog conversion circuit
31, 32, 91a, 91b: detection circuit
33: delay circuit
34, 92a, 92b: variable delay circuit
35, 36, 97a, 97b: decoder
37: comparator
38: calculation circuit
41, 42: weighting circuit
43: baseband circuit
55: transmission subtractor
61, 62: squaring circuit
63, 64, 71, 72: analog-to-digital converter
65, 66, 85: carrier frequency generation circuit
67, 68, 84, 87, 94a, 94b: multiplier
69: hybrid circuit
73: storage circuit
74: adder
75, 86: orthogonal carrier frequency generation circuit
83: subtractor
93a, 93b, 96a, 96b: buffer
95a, 95b: PN code generation circuit
100, 200: circuit
1100: elevator system
1101: building
1103a, 1103b: base station wireless device
1102a, 1102b: base station two orthogonally polarized integral antenna
1111: cab
1112a, 1112b: terminal station two orthogonally polarized integral antenna
1113: terminal station wireless device
1114: high frequency cable
1200: substation equipment surveillance system
1201: transformer
1202: terminal station two orthogonally polarized integral antenna
1203: terminal station wireless device
1211: base station device
1212: base station two orthogonally polarized integral antenna
1213: base station wireless device

The invention claimed is:
1. A wireless communication system comprising a transmitter that transmits electromagnetic waves in which a polarization direction rotates according to a signal in which data is loaded on a carrier, and a receiver that receives the electromagnetic waves and demodulates the data,
wherein the transmitter imparts angle information indicating a polarization direction for transferring the data to the signal, and sets a rotation frequency of the polarization direction to a frequency lower than a frequency of the carrier, and
the receiver changes the polarization direction of the received electromagnetic waves based on the angle information transferred by the electromagnetic waves.

2. The wireless communication system according to claim 1,
wherein the receiver detects a temporal change in the polarization direction of the received electromagnetic waves, based on the angle information, and changes the polarization direction of the received electromagnetic waves according to the temporal change.

3. The wireless communication system according to claim 2,
wherein when the receiver determines that the detected temporal change in the polarization direction is abnormal, the receiver calculates a vector difference between a normal polarization direction and the detected polarization direction, and changes the polarization direction of the received electromagnetic waves into a direction perpendicular to a direction of the vector difference.

4. The wireless communication system according to claim 2,
wherein the receiver includes:
a first antenna and a second antenna orthogonal to the first antenna;
a first detector that detects an output of the first antenna and a second detector that detects an output of the second antenna;
a polarization angle detection circuit that detects a polarization direction of the received electromagnetic waves from an output of the first detector and an output of the second detector; and
a first decoder that extracts the angle information from an output of the polarization angle detection circuit, and a second decoder that receives the output of the polarization angle detection circuit via a delay circuit and extracts the angle information, and
detects a temporal change in the polarization direction of the received electromagnetic waves based on an output of the first decoder and an output of the second decoder.

5. The wireless communication system according to claim 4,
wherein the receiver includes a storage circuit that stores information on a temporal change in the detected polarization direction.

6. The wireless communication system according to claim 2,
wherein the receiver includes
a first antenna and a second antenna orthogonal to the first antenna;
a first squaring circuit that squares an output of the first antenna, and a first analog-to-digital converter that converts an output of the first squaring circuit to a digital signal;
a second squaring circuit that squares an output of the second antenna, and a second analog-to-digital converter that converts an output of the second squaring circuit to a digital signal;
a first decoder that extracts the angle information from an output of the first analog-to-digital converter;
a second decoder that extracts the angle information from an output of the second analog-to-digital converter received via a first variable delay circuit, and
detects a temporal change in the polarization direction of the received electromagnetic waves based on an output of the first decoder and an output of the second decoder.

7. The wireless communication system according to claim 6,
wherein the output of the first antenna is input to the first squaring circuit via a first circuit that synchronizes the transmitter and the receiver with each other based on synchronization supplement data, and the output of the second antenna is input to the second squaring circuit via a second circuit that synchronizes the transmitter and the receiver with each other based on the synchronization supplement data.

8. The wireless communication system according to claim 2,
wherein the receiver includes:
a first antenna and a second antenna orthogonal to the first antenna;
a first detector that detects an output of the first antenna and a second detector that detects an output of the second antenna; and
a first decoder that extracts the angle information from an output of the first detector, and a second decoder that extracts the angle information from an output of the second detector received via a variable delay circuit, and
detects a temporal change in the polarization direction of the received electromagnetic waves based on an output of the first decoder and an output of the second decoder.

9. The wireless communication system according to claim 1,
wherein the transmitter includes:
a polarization rotation frequency generation circuit that sets the rotation frequency; and
a transmission frequency generation circuit that generates the carrier.

10. The wireless communication system according to claim 1,
wherein the transmitter includes:
a first transmission carrier frequency generation circuit that outputs a signal having a first frequency; and
a second transmission carrier frequency generation circuit that outputs a signal having a second frequency different from the first frequency, and
wherein a frequency of the carrier is set to a half of a sum of the first frequency and the second frequency, and the rotation frequency is set to a half of a difference between the first frequency and the second frequency.

11. The wireless communication system according to claim 10,
wherein the transmitter includes:
a digital signal processing circuit that outputs a signal in which the data and the angle information coexist; and
a digital filter that limits a frequency component of an output of the digital signal processing circuit.

12. The wireless communication system according to claim 1,
wherein the transmitter includes:
a first transmission carrier frequency generation circuit that outputs a first signal having a first frequency;
a second transmission carrier frequency generation circuit that outputs a second signal having a second frequency different from the first frequency;

a first digital signal processing circuit and a second digital signal processing circuit that output a signal in which the data and the angle information coexist;

a first digital filter that limits frequency components of an output of the first digital signal processing circuit; and a second digital filter that limits frequency components of an output of the second digital signal processing circuit, and further includes a hybrid circuit that modulates the first signal according to an output of the first digital filter, and modulates the second signal according to an output of the second digital filter, and outputs the carrier in which the rotation frequency is set to a frequency of a half of a difference between the first frequency and the second frequency from the first and second modulated signals.

13. The wireless communication system according to claim 1, wherein the transmitter includes:

a first transmission carrier frequency generation circuit that outputs a first signal having a first frequency;

a first orthogonal carrier frequency generation circuit that outputs a second signal having the first frequency and orthogonal to the first signal;

a second transmission carrier frequency generation circuit that outputs a third signal having a second frequency different from the first frequency;

a second orthogonal carrier frequency generation circuit that outputs a fourth signal having a second frequency and orthogonal to the third signal;

first to fourth digital signal processing circuits that output a signal in which the data, the angle information, and synchronization supplement data coexist;

first to fourth digital filters that limit respective frequency components of outputs of the first to fourth digital signal processing circuits; and a hybrid circuit that modulates the first to fourth signals according to respective outputs of the first to fourth digital filters, and outputs the carrier in which the rotation frequency is set to a frequency of a half of a difference between the first frequency and the second frequency from first and second modulated signals.

14. An elevator system in which a cab elevates inside a building, the elevator system comprising:

a terminal station wireless device and a terminal station two orthogonally polarized integral antennas connected to the terminal station wireless device, the terminal station wireless device and the terminal station two orthogonally polarized integral antennas being mounted on the cab; and a base station wireless device and a base station two orthogonally polarized integral antennas connected to the base station wireless device, the base station wireless device and the base station two orthogonally polarized integral antennas being provided in an upper portion or a lower portion inside the building, wherein the terminal station wireless device and the base station wireless device communicate with each other, and the terminal station wireless device and the base station wireless device include the wireless communication system according to claim 1.

15. A substation equipment surveillance system including a plurality of transformers, the substation equipment surveillance system comprising:

a plurality of terminal station wireless devices and a plurality of terminal station two orthogonally polarized integral antennas connected to the plurality of terminal station wireless devices, the terminal station wireless devices and the terminal station two orthogonally polarized integral antennas being provided in the plurality of transformers; and a plurality of base station wireless devices less than the plurality of transformers and a plurality of base station two orthogonally polarized integral antennas connected to the plurality of base station wireless devices, the base station wireless devices and the base station two orthogonally polarized integral antennas being provided near the plurality of transformers, wherein the terminal station wireless devices and the base station wireless devices communicate with each other, and the terminal station wireless devices and the base station wireless devices include the wireless communication system according to claim 1.

* * * * *